Nov. 3, 1959 G. E. GAGNIER 2,910,752
HOOK HEAD FASTENER
Filed Dec. 16, 1954
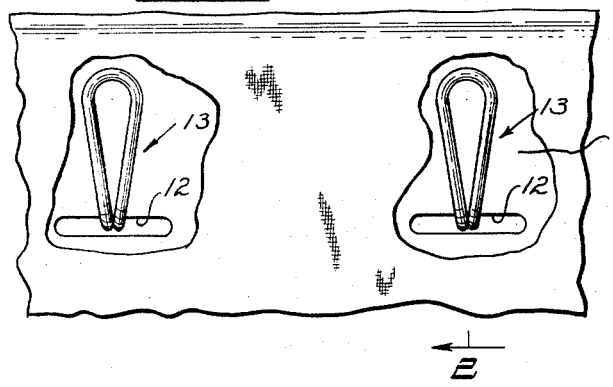
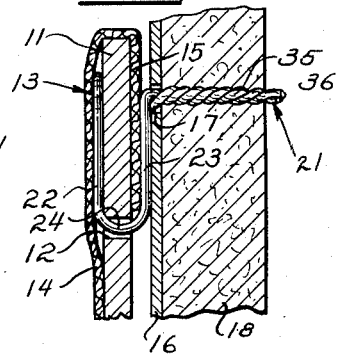
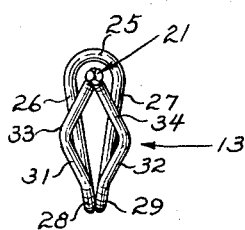
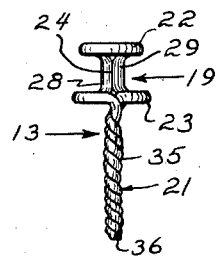
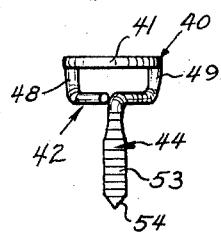
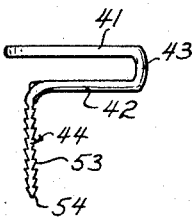
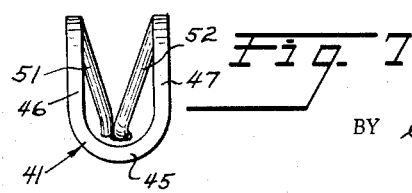
INVENTOR
GEORGE E. GAGNIER
BY Strauch, Nolan + Diggins
ATTORNEYS

United States Patent Office 2,910,752
Patented Nov. 3, 1959

2,910,752

HOOK HEAD FASTENER

George E. Gagnier, Detroit, Mich., assignor to Gagnier Fibre Products Company, Oak Park, Mich., a corporation of Michigan Application December 16, 1954, Serial No. 475,748

2 Claims. (Cl. 24—85)

This invention relates to hook head fasteners and particularly to simple but peculiarly efficient fasteners of this type made from a single length of metal and having corrugated or serrated studs.

It is therefore the major object of this invention to provide a novel hook head fastener made from a single length of metal and having a head composed of generally parallel arms joined at one end by an integral bridge and having an angularly related surface roughened attachment stud projecting from the free end of the lower arm and away from the head. In one embodiment the stud comprises twisted together coextensive sections of the metal, and in another embodiment the stud is a single serrated section of the metal.

Further objects of the invention will appear as the description proceeds in connection with the appended claims and the annexed drawings wherein:

Figure 1 illustrates in side elevation the attachment of a trim panel to a support structure by fasteners made according to the invention;

Figure 2 is a section taken on line 2—2 of Figure 1 showing one form of fastener;

Figures 3 and 4 are bottom and front views respectively of the fastener of Figure 2; and Figures 5, 6 and 7 are front, side and top views respectively of another embodiment of the fastener of the invention.

Referring to Figures 1–4, the trim panel 11 of relatively rigid fibre board is formed with slots 12 to enable the head of the fastener 13 to be hooked thereinto after the covering cloth 14 has been applied to the front side and extended around the edges of the panel to be glued or otherwise secured all around the inner surface of the panel at 15.

The support structure here comprises a sheet of metal 16 formed with fastener stud entrance holes 17 and backed behind those holes with sufficient thickness of wood, fibre board 18 or the like to be pierced by and hold the fastener stud when the latter is driven through hole 17.

This stud 13 has a hook head 19 and a surface roughened stud 21. The head comprises spaced substantially parallel arms 22 and 23 joined integrally by an arcuate bridge 24, and stud 21 projects away from the head at right angles from the free end of lower arm 23. While upper arm 22 is shown as slightly longer than lower arm 23, for some purposes they may be of equal length or arm 23 may be slightly longer. In general they are preferably substantially coextensive and preferably the lower arm is shorter for a purpose to appear.

Upper arm 22 comprises an arcuate end section 25 from the ends of which side members 26 and 27 converge into substantial contact, and are then bent down at about right angles in side by side parallel sections 28 and 29 to form the arcuate bridge portion of the head. Then the members diverge from the bottom of bridge 24 to a point about midway of the length of lower arm 23 and then converge until they contact below the arcuate end of the upper head arm. These divergent members 31, 32 and convergent members 33, 34 provide a lower arm 23 that has an appreciably wider trim panel engagement area than the upper arm 22. The lower arm is essentially in the form of a loop or rough diamond that is intermediately wider than and of greater surface bearing area than arm 22.

At their point of contact at the free end of lower arm 22 the members are twisted tightly together to form the stud and at the same time provide as surface roughness a generally spiral recess and projection configuration indicated at 35, and preferably the end of the twisted stud is sharpened to a point at 36.

In practice in making this fastener, I prefer to cut a length of metal wire that is bendable but stiff enough to retain a given shape during its use as a fastener, first bend it into curve 25 at its middle portion, and then bend the ends in succession to provide upper arm side members 26 and 27, bridge sections 28 and 29 and the lower arm side members. Then the ends of the wire are bent at right angles to arm 23 and tightly twisted together to form stud 21.

This provides a hook head fastener which may be readily attached to the rear of panel 11 by inserting the upper head arm 22 through and along slot 12 with a turning motion until the fastener assumes the proper position of Figure 2. In practice the upper head arm 22 is flattened to introduce as little as possible thickness between the cloth and trim panel. The wide bearing area coverage of lower arm 23 which contacts the bottom of the panel 11 and the outside surface of plate 16 materially aids in preventing undesired lateral rocking of the fastener which might stretch the cloth cover unduly, particularly when the stud 21 is being driven blind through hole 17 into the holding wood 18, but the chief advantage of this wide area lower head arm is that when the stud is being driven blind into wood 18, it so distributes the reactive forces that the fastener does not rupture the fibre board or injure the cloth, the panel itself effectively becoming part of the fastener head during assembly.

During the assembly of the trim panel to the support structure, all of the fasteners are placed on the panel in general alignment with the spacing of holes 17, and then the entire panel is pressed onto the support structure so that the points 36 enter the holes 17. Then the trim panel is pushed onto the support structure from the cloth side by suitable wide area means, the studs 21 being driven into the wood 18 which holds them like any barbed or like nail.

Because of the foregoing manner of assembly it is best that lower head arm 23 be shorter than the upper arm so as to locate the line of force through the stud to intersect the head.

Referring now to Figures 5, 6 and 7 the fastener 40 has a hook head consisting of spaced generally parallel upper and lower arms 41 and 42 integrally connected by a bridge 43, and a barbed or serrated stud 44 consisting of an integral right angle extension from the lower head arm 42.

The upper head arm 41 comprises an arcuate end section 45 from the ends of which extend parallel side members 46 and 47 of equal length which turn downwardly at right angles to provide laterally spaced bridge sections 48 and 49. From the bottom of the bridge the members converge to substantial contact at a point below but preferably a small amount rearwardly of the upper head end section 45.

These converging sections 51 and 52 form the lower head arm. One of them terminates at the top of the stud and the other 52 is downturned at right angles to form stud 44. The stud 44, for most of its length is serrated or barbed on both sides at 53 and also its end is pointed at 54.

Preferably the barbs 53 are formed and the stud is flattened in the same operation by compressing the normally round cross-section wire between suitably toothed dies. By flattening the stud, as shown in Figure 5, effectively longer serrations or barbs are formed on the stud.

This fastener is attached to the trim panel and the assembly made in the same manner as in the other embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hook head fastener comprising spaced generally parallel upper and lower head arms, a bridge integrally connecting adjacent ends of said arms, and a straight stud projecting at right angles from an end of said lower arm that is remote from said bridge, said fastener being formed from a single length of wire bent at its medial portion to provide side members defining an upper arm loop and extending toward the bridge where said side members are bent to form said bridge and then bent away from the bridge to define said lower head arm, and said side members in the lower head arm converging into contact at the end of said lower head arm remote from the bridge and being bent away from said head at an angle and tightly twisted together to form a sharp pointed nail-like stud integral with the head.

2. The hook head fastener defined in claim 1, wherein said side members in the bridge are disposed in close side by side relation and said lower head arm side members define a substantially diamond shaped loop wider than the upper head arm loop.

References Cited in the file of this patent
UNITED STATES PATENTS

| | | |
|---|---|---|
| 344,136 | Raymond | June 22, 1886 |
| 581,074 | King | Apr. 20, 1897 |
| 899,968 | Goldberg | Sept. 29, 1908 |
| 1,970,335 | Place | Aug. 14, 1934 |
| 2,059,049 | Smith | Oct. 27, 1936 |

FOREIGN PATENTS

| | | |
|---|---|---|
| 5,315 | Great Britain | 1880 |